(12) United States Patent
Onishi et al.

(10) Patent No.: US 6,475,667 B1
(45) Date of Patent: Nov. 5, 2002

(54) ELECTRODE PLATE UNIT FOR RECHARGEABLE BATTERY AND MANUFACTURING METHOD THEREOF

(75) Inventors: Masato Onishi, Toyohashi (JP); Shoji Karasawa, Kosai (JP); Toshiyuki Nishimori, Toyama (JP)

(73) Assignees: Matsushita Electric Industrial Co., Ltd, Osaka (JP); Toyota Jidosha Kabushiki Kaisha, Aichi (JP)

( * ) Notice: Subject to any disclaimer, the term of this patent is extended or adjusted under 35 U.S.C. 154(b) by 80 days.

(21) Appl. No.: 09/694,347

(22) Filed: Oct. 24, 2000

(30) Foreign Application Priority Data

Oct. 26, 1999 (JP) .............................. 11-304226

(51) Int. Cl.$^7$ ................................ H01M 2/26
(52) U.S. Cl. .................. 429/161; 429/211; 29/623.4
(58) Field of Search ................ 429/160, 161, 429/211; 29/623.4, 623.5

(56) References Cited

U.S. PATENT DOCUMENTS

| | | | | |
|---|---|---|---|---|
| 3,753,783 A | * | 8/1973 | Eberle | 429/160 X |
| 3,960,603 A | * | 6/1976 | Morioka et al. | 429/211 X |
| 4,309,492 A | * | 1/1982 | Bernard | 429/161 |
| 4,495,259 A | * | 1/1985 | Uba | 429/161 |
| 5,415,954 A | | 5/1995 | Gauthier et al. | 429/94 |
| 5,472,802 A | * | 12/1995 | Holland et al. | 429/161 X |
| 5,972,532 A | | 10/1999 | Oweis et al. | 429/94 |
| 6,187,062 B1 | * | 2/2001 | Oweis et al. | 429/211 X |
| 6,193,765 B1 | * | 2/2001 | Nakanishi et al. | 429/161 X |

FOREIGN PATENT DOCUMENTS

| | | | |
|---|---|---|---|
| EP | 0497456 | 8/1992 | H01G/4/30 |
| EP | 0955682 | 11/1999 | H01M/2/26 |
| EP | 0966053 | 12/1999 | H01M/2/26 |
| JP | 7-220715 | 8/1995 | |
| JP | 11-86835 | 3/1999 | H01M/2/28 |
| WO | 99/05748 | 2/1999 | |

OTHER PUBLICATIONS

English Language Abstract of JP 7–220715.
English Language Abstract for JP 11–86835.

* cited by examiner

*Primary Examiner*—Stephen Kalafut
(74) *Attorney, Agent, or Firm*—Greenblum & Bernstein, P.L.C.

(57) ABSTRACT

Positive electrode plates 2 and negative electrode plates 3 are stacked with separators 4 in between them to form an electrode plate unit 1, the end faces of electrode plates 2 and 3 with mutually opposite polarity being made to protrude from the two side surfaces of this electrode plate unit 1. A thermal spray metal coating 8 is provided to each of the two side surfaces of the electrode plate unit 1 for integrally joining the electrode plates 2 and 3, and for connecting the collector plates 5 and 6 to the electrode plates.

13 Claims, 8 Drawing Sheets

ELECTRODE PLATE UNIT FOR RECHARGEABLE BATTERY AND MANUFACTURING METHOD THEREOF

BACKGROUND OF THE INVENTION

1. Field of the Invention

The present invention relates to an electrode plate unit for a rechargeable battery and a manufacturing method of same.

2. Description of the Related Art

Batteries are classified into primary batteries and secondary batteries or rechargeable batteries, and there are various configurations for each of these two types of battery. For instance, the sealed alkaline rechargeable battery 41 shown in FIG. 12 is structured such that positive electrode plates and negative electrode plates are stacked with separators in between them to form an electrode plate unit 47 that constitutes elements for electromotive force, which is housed in a battery case 42 along with electrolyte. The opening in the battery case 42 is closed off with a lid 46 provided with a safety vent 45. Leads 49 extend upward from the top on one side of the positive electrode plates that make up the electrode plate unit 47, and a positive electrode terminal 43 is connected to the upper portion of these leads. Similarly, leads 49 extend upward from the top on the other side of the negative electrode plates, a negative electrode plate terminal 44 is connected to the upper portion of these leads, and the positive electrode terminals 43 and negative electrode plate terminals 44 are attached to the lid 46.

As shown in FIG. 13, the positive and negative electrode plates in the above-mentioned electrode plate unit 47 are integrally joined together at welds 50 in the leads 49 extending from the electrode plates. As disclosed in Japanese Laid-Open Patent Application H7-220715, for example, laser welding can be used to advantage in this welding. That is because, with resistance welding, impurities or an oxidation film at the place being welded can generate sparks, resulting in a weak weld or preventing a uniform weld from being obtained. One particularly favorable method involves passing a laser beam through the leads to form a through-hole, and then filling in this through-hole with thermally sprayed metal and re-solidifying the molten metal to obtain an integrated weld.

With the conventional battery 41 described above, the leads 49 extend from the top on one side of the electrode plates and are welded together, and the electrode terminals 43 and 44 are connected, so the average distance from the overall surface of the electrode plates to the collector portion of the leads 49 is long, and this is a problem in that the internal battery resistance is higher and the electrode active material utilization is lower, so the output of the battery is also lower.

In view of this, there is proposed a new structure for the electrode plate unit of a battery in which collector plates are disposed opposite from and abutting on both side surfaces of the electrode plate unit, and the lateral edges of the electrode plates and the collector plates are integrally welded. However, when simple seam welding is employed to integrally connect the collector plates and the lateral edges of the electrode plates, it is difficult to obtain a good connection and a poor joining state results, the problems with which are inadequate battery output and insufficient weld strength. Another problem is that even with laser welding it is exceedingly difficult to join the components securely without having a detrimental effect on the electrode plates, and there has been a need for a method for properly joining collector plates to the lateral end edges of the electrode plate unit.

SUMMARY OF THE INVENTION

In light of the above problems encountered in the past, it is an object of the present invention to provide an electrode plate unit for a rechargeable battery in which the collector plates are securely joined to either side surface of the electrode plate unit, and a method for manufacturing same.

To achieve the above object, the present invention provides a battery comprising:

an electrode plate unit, including a plurality of positive electrode plates and a plurality of negative electrode plates that are alternately stacked upon one another with intervening separators therebetween, thereby constituting respective groups of positive and negative electrode plates, wherein lateral edges of the positive electrode plates protrude beyond the negative electrode plates on one side, and lateral edges of the negative electrode plates protrude beyond the group of positive electrode plates on the opposite side;

collector plates arranged respectively on the lateral edges of the positive and negative electrode plates; and thermal spray metal coatings formed on end surfaces of said respectively protruded lateral edges of the positive and negative electrode plates for integrally joining the positive electrode plates together and the negative electrode plates together, respectively, and for connecting respective collector plates to the positive electrode plates and the negative electrode plates.

The thermal spray coating provides secure connections between the electrode plates and the collector plates, whereby a battery with less internal resistance and higher battery output can be obtained.

Other and further objects, features and advantages of the invention will be apparent more fully from the following description.

DESCRIPTION OF THE PREFERRED EMBODIMENTS

A first embodiment of a rechargeable battery to which an electrode plate unit of the present invention is applied will now be described through reference to FIGS. 1 to 5.

Figure 1:
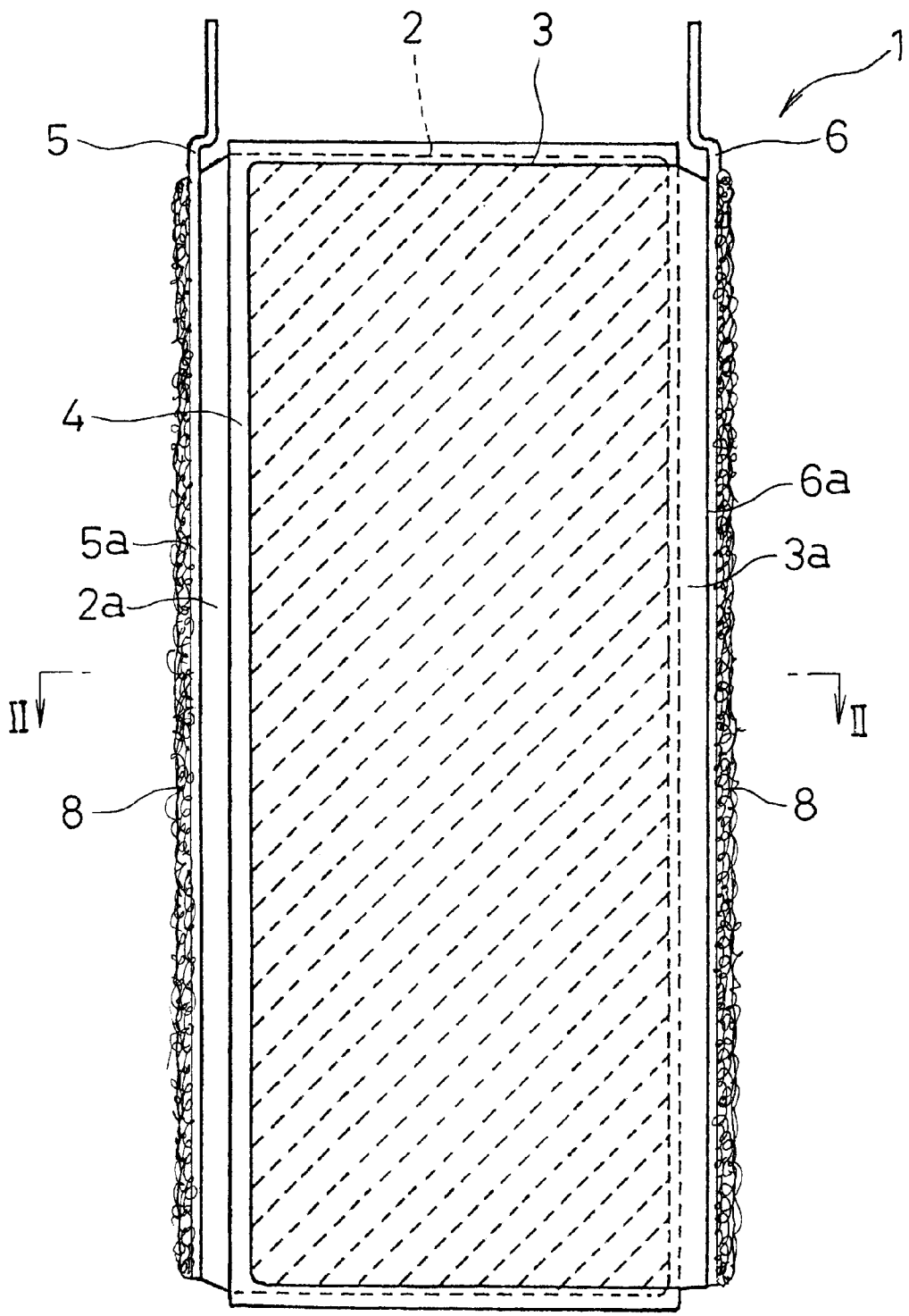
FIG. 1 is a front view of the electrode plate unit in the first embodiment of the present invention.
Figure 2:
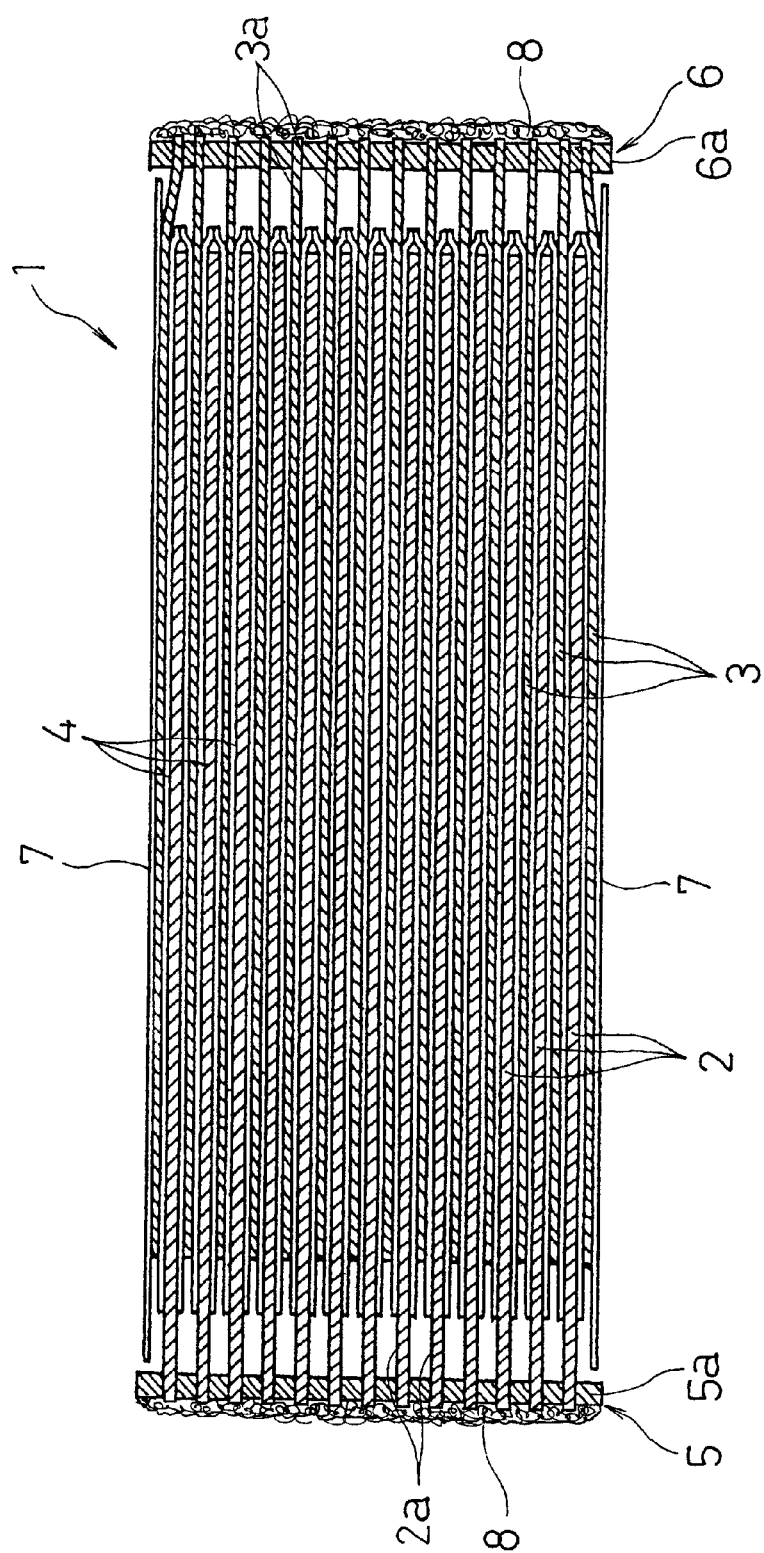
FIG. 2 is a cross section along the II—II line in FIG. 1.
Figure 12:
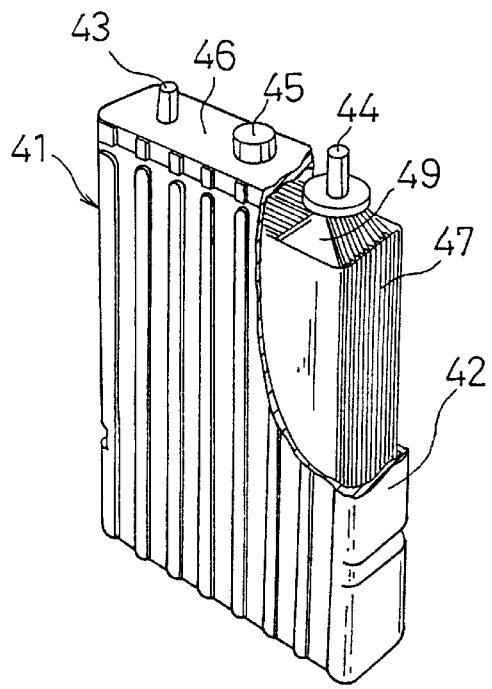
FIG. 12 is a partially cut-away oblique view of a conventional rechargeable battery.
Figure 13:
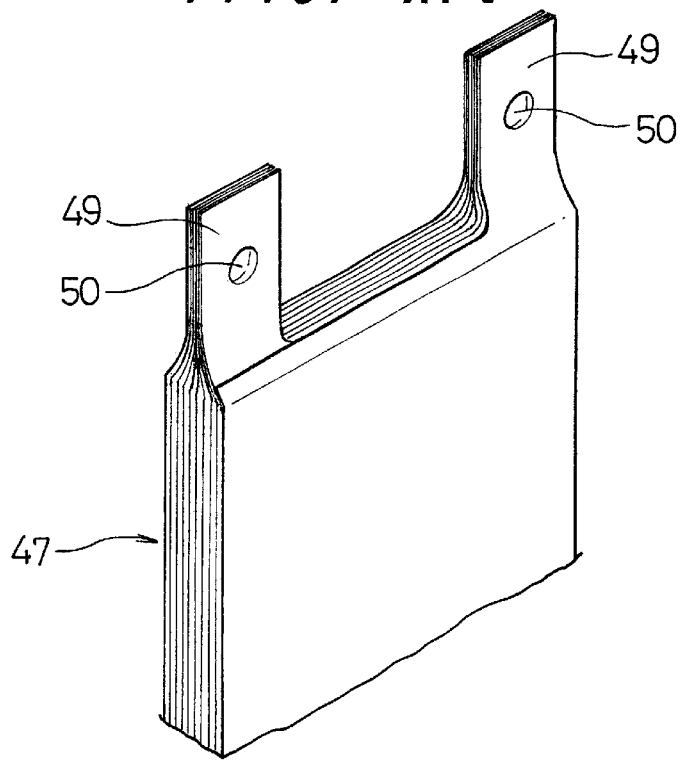
FIG. 13 is an oblique view of the leads of the electrode plate unit in this same conventional example.

The rechargeable battery in this embodiment is a nickel metal hydride rechargeable battery, in which an electrode plate unit 1 as shown in FIGS. 1 and 2 is housed along with electrolyte in a prismatic battery case (not shown) that is open at the top and has short-side surfaces and long-side surfaces, and the top opening in the battery case is integrally closed off by a lid (not shown), just as with the conventional example shown in FIG. 12.

The electrode plate unit 1 is structured such that numerous positive electrode plates and negative electrode plates parallel to the long-side surfaces of the battery case are stacked in the short-side surface direction with separators in between them, and collector plates 5 and 6 of the positive electrodes and negative electrodes, respectively, are joined to substantially the entire surface on both sides at the ends in the direction along the long-side surfaces of the case.

To describe this in further detail, the numerous positive electrode plates 2 and numerous negative electrode plates 3 are alternately disposed, and each positive electrode plate 2 is covered with a sheath-like separator 4 having openings in the lateral direction. The result is an electrode plate unit 1 in which the positive electrode plates 2 and negative electrode plates 3 are stacked with the separators 4 interposed therebetween. In FIG. 1, the region where the positive electrode plates 2 and the negative electrode plates 3 oppose each other with the intervening separators 4 and generate electric power is indicated by broken oblique lines. The lateral edges of the group of positive electrode plates 2 protrude beyond the group of negative electrode plates 3 on one side, and the lateral edges of the group of negative electrode plates 3 protrude beyond the group of positive electrode plates 2 on the opposite side, and leads 2a and 3a are provided to these respective protruding lateral edges. The positive electrode plates 2 are composed of foamed metal of nickel, and the leads 2a are formed by compressing this foamed nickel and seam welding a lead plate to one side of the foamed nickel by ultrasonic welding. The negative electrode plates 3 are each 1, produced by applying active material to all of a punched nickel sheet except for the lead 3a portion. Numeral 7 represents an outer peripheral separator provided to the outer surface between the collector plates 5 and 6 of the electrode plate unit 1.

Figure 3:
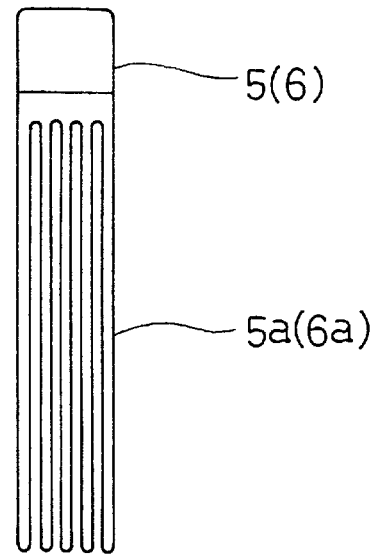
FIG. 3 is a front view of a collector plate in this same embodiment.
Figure 4:
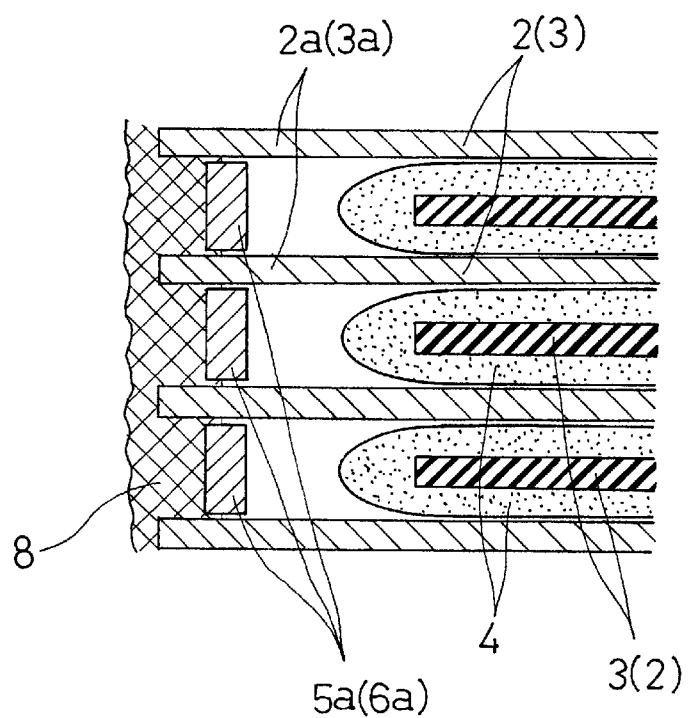
FIG. 4 is an enlarged lateral cross section plan view of the main components of the electrode plate unit in this same embodiment.

The collector plates 5 and 6 are made from nickel sheets or nickel-plated steel sheets, and as shown in FIG. 3, they comprise comb-shaped sheets on which are formed comb teeth 5a and 6a that extend along a vertical or longitudinal direction, which are inserted in between the various leads 2a of the group of positive electrode plates 2 and in between the various leads 3a of the group of negative electrode plates 3, respectively. Nickel is thermally sprayed from the outside toward these leads 2a and comb teeth 5a and toward the leads 3a and comb teeth 6a in mutual contact, whereby a thermal spray metal coating 8 is formed, as shown in detail in FIG. 4. The leads 2a or 3a and the comb teeth 5a or 6a are thus integrally joined by this thermal spray metal coating 8.

Figure 5:
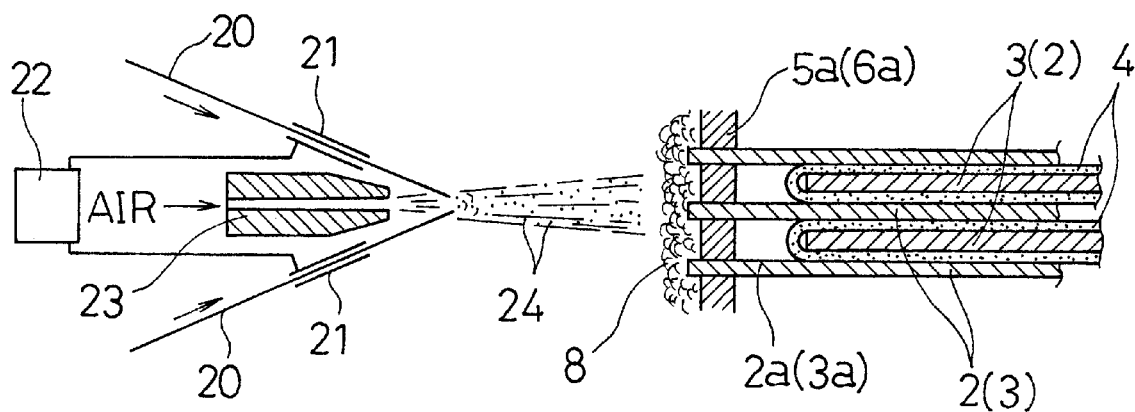
FIG. 5 is a diagram of the formation of the thermal spray metal coating in this same embodiment.

Arc spray process can be favorably applied as the method for this thermal spraying. As shown in FIG. 5, with arc thermal spray process, nickel wire 20, which is the thermal spray material, is inserted into a pair of feed guides 21 disposed in a V shape, and DC voltage is applied by a DC power source 22 to the wire 20 via the feed guides 21. Thereupon an arc is generated between the tips of the wires 20, which are close to each other, and melts the wires 20. The molten metal is blown into particles 24 by an air jet sprayed from an air nozzle 23, and the molten particles 24 are sprayed toward the leads 2a and the comb teeth 5a, and the leads 3a and the comb teeth 6a, thereby forming the thermal spray metal coating 8.

To give a specific example, it is favorable for the thermal spray process to be conducted using wires 20 with a diameter of 0.8 to 3 mm and at an arc current of 100 to 400 A, an arc voltage of 25 to 50 V, an arc gap of 300 to 900 $\mu$m, and a thermal spray distance of 100 to 200 mm.

It should go without saying that a flame spray process, plasma spray process, laser spray process, induction plasma spray process, or another such thermal spray method may also be applied instead of this arc thermal spray process.

With this embodiment, the leads 2a and 3a on the lateral edges of the various electrode plates 2 and 3 are effectively connected to the collector plates 5 and 6 by the thermally sprayed metal of the thermal spray metal coating 8 without any danger of poor welding occurring. Because of the short average distance from the overall surface of the electrode plates 2 and 3 to the collector portions, there is little internal resistance, the active material utilization rate is higher, the battery output is larger, and a battery with 1t secure connections and high reliability can be obtained.

Also, because the comb teeth 5a and 6a of the collector plates 5 and 6 are inserted between the leads 2a and 3a of the electrode plates 2 and 3, respectively, and these are integrally joined by the thermal spray metal coating 8, even if there is a large gap between the positive electrode plates 2, or between the negative electrode plates 3, or if there is a short distance from the side edges of the leads 2a and 3a to the side edges of the electrode plates 2 and 3 of opposite polarity, the comb teeth 5a and 6a of the collector plates 5 and 6 inserted between the leads 2a and between the leads 3a will effectively prevent the thermally sprayed metal from infiltrating to the electrode plates 3 or 2 of opposite polarity or the separators further in the interior between the electrode plates. Also, the connection of the collector plates 5 and 6 to the electrode plates can be accomplished simultaneously by the thermally sprayed metal, so there are fewer steps entailed in battery manufacture.

Figure 6:
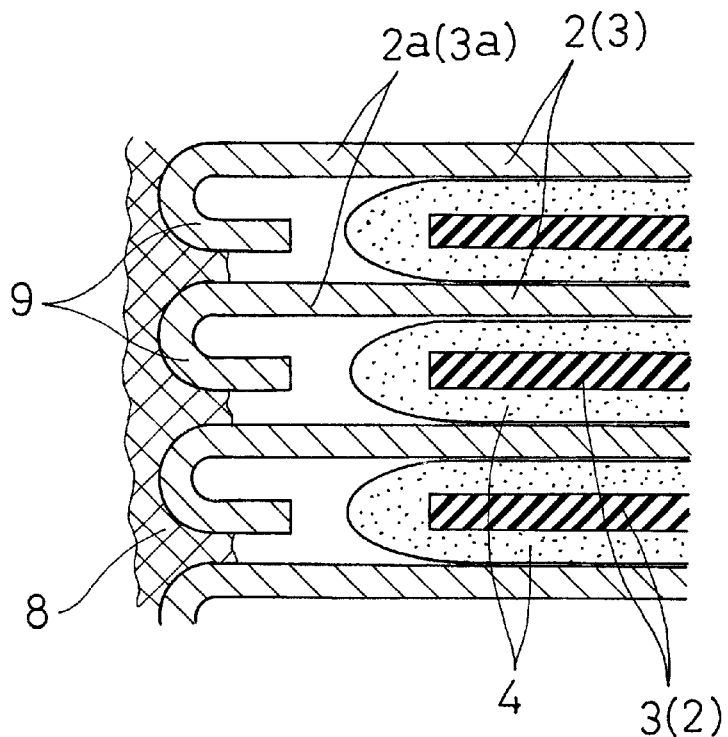
FIG. 6 is an enlarged lateral cross section plan view of the main components of the electrode plate unit in the second embodiment of the present invention.
Figure 7:
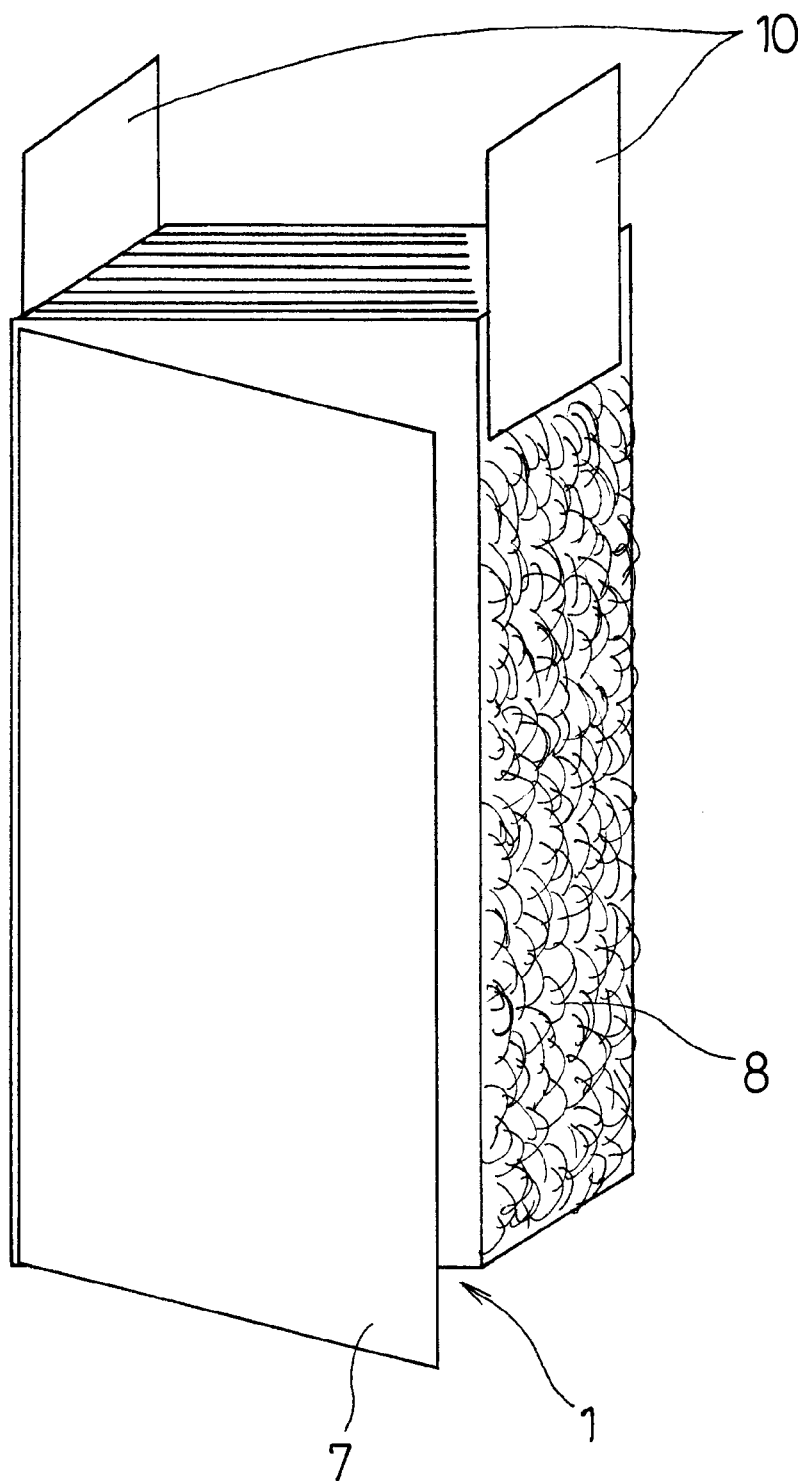
FIG. 7 is an oblique view of the electrode plate unit in this same embodiment.
Figure 8:
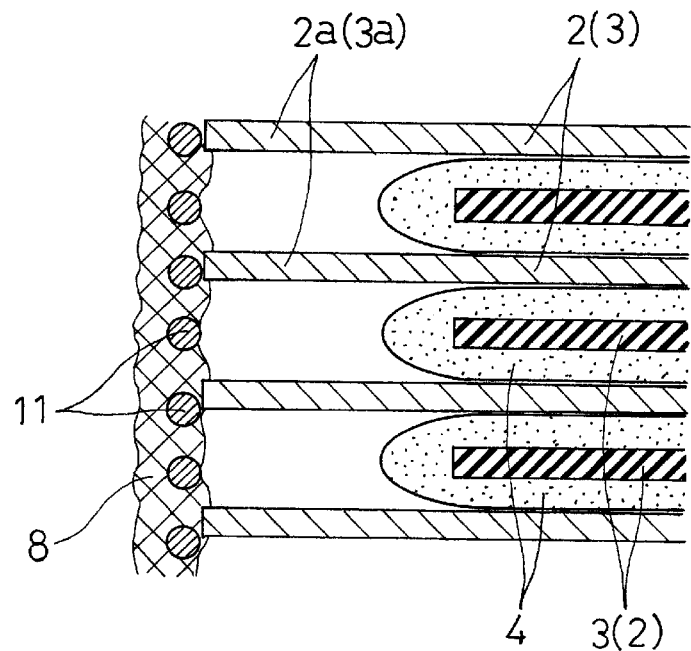
FIG. 8 is an enlarged lateral cross section plan view of the main components of the electrode plate unit in the third embodiment of the present invention.

Next, the second embodiment of the present invention will be described through reference to FIGS. 6 and 7. In the description of the following embodiments, those structural elements that are the same as in the first embodiment discussed above are labeled with the same reference numbers and will not be described again, with only the differences described.

collector plates 5 and 6 were composed of comb-shaped sheets in the first embodiment described above, but in this embodiment, as shown in FIG. 6, collector plates are not provided over the entire surface on both sides of the electrode plate unit 1. Instead, bent portions 9 that abut on or come close to the end edges of adjacent leads 2a and 3a are formed on the leads 2a and 3a of the positive electrode plates 2 and negative electrode plates 3, the thermal spray metal coating 8 is formed by subjecting the outer surfaces thereof directly to a thermal spray process, and the electrode plates 2 and 3 are integrally joined to each other and the collector portions formed by this thermal spray metal coating 8. As shown in FIG. 7, flat collector plates 10 for connecting to the electrode poles are welded to the upper part of the collector portions composed of this thermal spray metal coating 8.

With this embodiment, the bent portions 9 will effectively prevent the thermally sprayed metal from infiltrating to the positions of the electrode plates 3 and 2 of opposite polarity or the separators 4 further in the interior between the leads 2a or between the leads 3a of the electrode plates 2 and 3, and short-circuiting can be prevented without the use of collector plates 5 and 6 consisting of comb-shaped sheets. Otherwise, the same operation and effect as in the above first embodiment are achieved.

Next, the third embodiment of the present invention will be described through reference to FIG. 8 and FIGS. 9A to 9C.

Figures 9A, 9B, 9C:
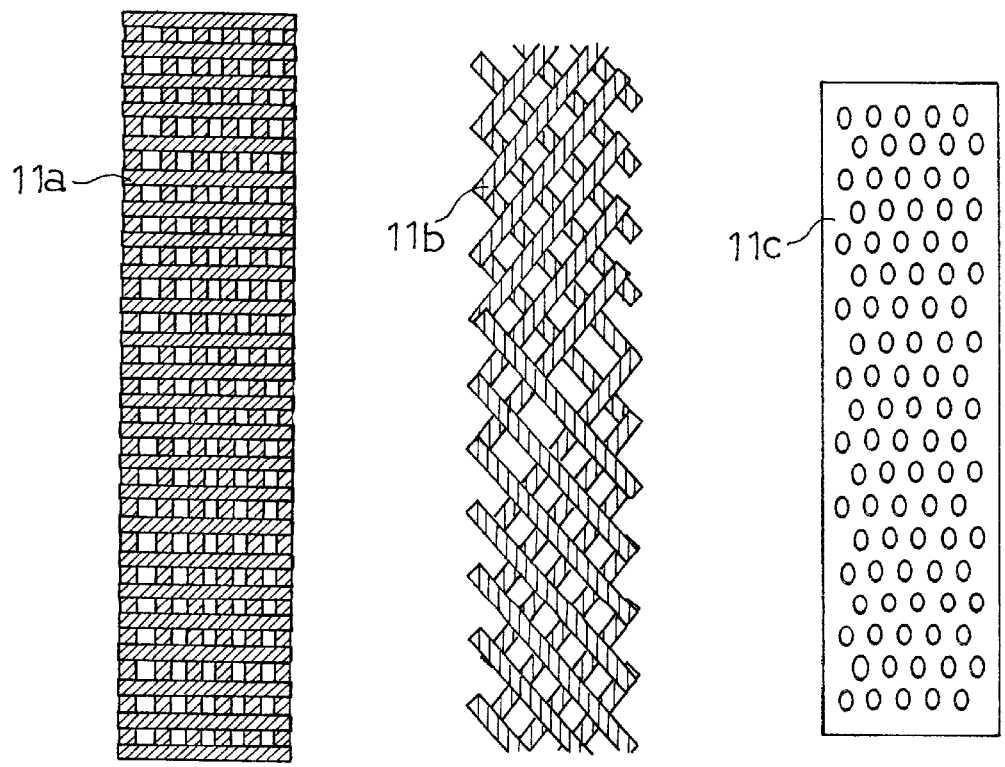
FIGS. 9A to 9C consist of front views illustrating specific examples of the perforated member in this same embodiment.

In this embodiment, instead of using collector plates 5 and 6 consisting of comb-shaped sheets, perforated members 11 are disposed in contact with both lateral end surfaces of the electrode plate unit 1, and the thermal spray metal coating 8 is formed by a thermal spray process on the outer surfaces of these members, the result of which is that the collector portions are formed with the thermal spray metal coating 8 and the perforated members 11 integrated, and the leads 2a and 3a of the electrode plates 2 and 3 are integrally joined to each other. The collector plates 10 are welded as shown in FIG. 7 to the upper part of the collector portions, just as in the second embodiment. As specific examples of the perforated members 11, a lattice-like screen member 11a as shown in FIG. 9A, a diagonal lattice-like screen member 11b as shown in FIG. 9B, or a punched metal or other such perforated member 11c as shown in FIG. 9C can be used favorably.

With this embodiment, the perforated members 11 contribute to good mechanical strength of the resulting collector portions, and when the collector plates 10 are connected to these, the resulting battery has a high output, secure connections, and high reliability.

Again in this embodiment, the bent portions 9 may be formed at the lateral edges of the leads 2a and 3a, in which case the thermally sprayed metal itself or the attendant heat can be even more effectively prevented from infiltrating between the electrode plates, causing short circuits, and the strength of the collector portions is also higher.

Next, the fourth embodiment of the present invention will be described through reference to FIGS. 10 and 11.

Figure 10:
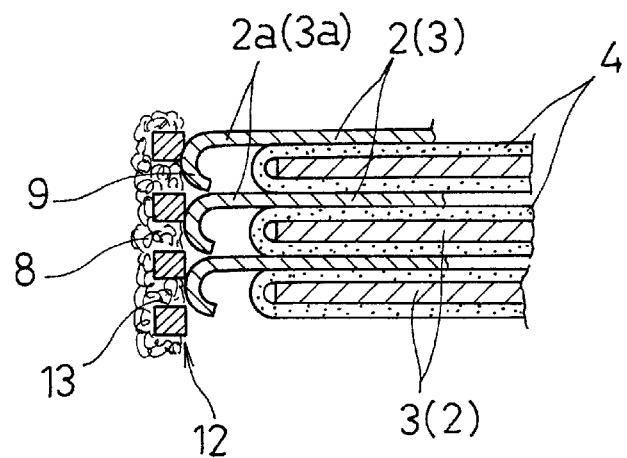
FIG. 10 is an enlarged lateral cross section plan view of the main components of the electrode plate unit in the fourth embodiment of the present invention.
Figure 11:
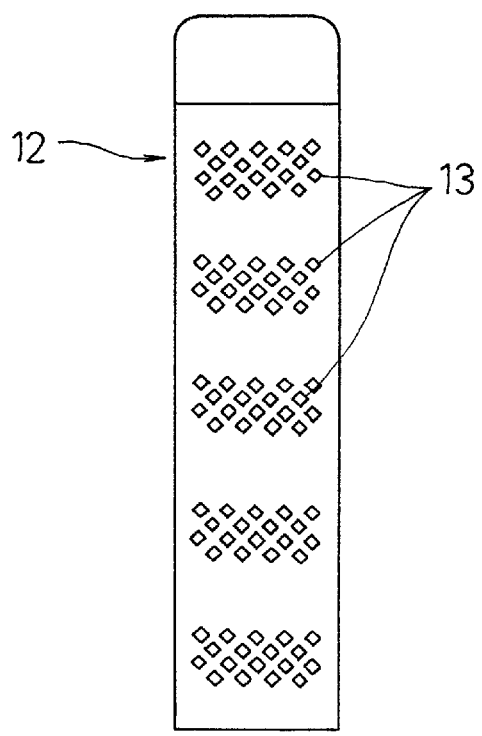
FIG. 11 is a front view of a collector plate in this same embodiment.

In this embodiment, as shown in FIG. 10, the collector plates 12 shown in FIG. 11, which have perforations 13 formed in at least part thereof, are disposed in contact with the lateral end surfaces of the electrode plate unit 1, and the perforations 13 are subjected to a thermal spray process to form the thermal spray metal coating 8. Also, bent portions 9 are provided to the leads 2a and 3a of the electrode plates 2 and 3 of the electrode plate unit 1, which prevents the thermally sprayed metal itself or the attendant heat from infiltrating between the electrode plates, causing short circuits. The perforations 13 in the collector plates 12 are formed in bands comprising numerous perforations and spaced a suitable distance apart in the lengthwise direction of the collector plates 12. These perforations 13 can be formed by press working, or by expansion, in which slits cut into the collector plates 12 are pulled apart. The above-mentioned bent portions 9 do not necessarily have to be provided in this embodiment. Also, the perforations 13 may be formed over substantially the entire surfaces of the collector plates 12.

With this embodiment, the thermally prayed metal of the thermal spray metal coating 8 works its way into the perforations 13 of the collector plates 12, and as a result, the leads 2a and the leads 3a of the electrode plates 2 and 3 are each integrally joined in numerous bands spaced a suitable distance apart, and joining to the collector plates 12 is accomplished at the same time. This means that the collector plates 12 ensure sufficient strength in the collector portions, and the average distance is short from the overall surfaces of the electrode plates 2 and 3 to the perforations 13 integrally joined by the thermal spray metal coating 8, so there is little internal resistance, high battery performance can be ensured, and the connection of the collector plates 12 can be accomplished simultaneously, so fewer steps are entailed in battery manufacture.

Prismatic batteries were described in the above first to fourth embodiments, but similar results will be obtained with a cylindrical battery (in which the electrode plate unit comprises positive electrode plates and negative electrode plates facing each other via separators, all of which are wound in a coil). Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery comprising:
    an electrode plate unit, including a plurality of positive electrode plates and a plurality of negative electrode plates that are alternately stacked upon one another with intervening separators therebetween, thereby constituting respective groups of positive and negative electrode plates, wherein lateral edges of the positive electrode plates protrude beyond the negative electrode plates on one side, and lateral edges of the negative electrode plates protrude beyond the group of positive electrode plates on the opposite side;
    collector plates arranged respectively on the lateral edges of the positive and negative electrode plates; and
    thermal spray metal coatings formed on end surfaces of said respectively protruded lateral edges of the positive and negative electrode plates for integrally joining the positive electrode plates together and the negative electrode plates together, respectively, and for connecting respective collector plates to the positive electrode plates and the negative electrode plates.

2. The battery according to claim 1, wherein the collector plates have comb-shaped portions, these comb-shaped portions being inserted between the positive electrode plates and between the negative electrode plates respectively, and the respective positive and negative electrode plates and the collector plates are integrally joined by thermally sprayed metal of said thermal spray metal coating.

3. The battery according to claim 1, wherein the collector plates comprise perforated members disposed in contact with the end surfaces of said respectively protruded lateral edges of the positive and negative electrode plates, wherein said thermal spray metal coating is provided over said perforated members.

4. The battery according to claim 1, wherein said collector plates are formed with a perforated portion on at least part thereof, and said thermal spray metal coating is provided to said perforated portion.

5. The battery according to claim 1, wherein said respective lateral edges of the positive and negative electrode plates are formed with bent portions that come close to or abut on the lateral edges of adjacent positive or negative electrode plates.

6. The battery according to claim 5, wherein the collector plates comprise perforated members disposed in contact with the end surfaces of said respective lateral edges of the positive and negative electrode plates, wherein said thermal spray metal coating is provided over said perforated members.

7. The battery according to claim 5, wherein said collector plates are formed with a perforated portion on at least part thereof, and said thermal spray metal coating is provided to said perforated portion.

8. A method of manufacturing an electrode plate unit for a battery comprising the steps of:

stacking a plurality of positive electrode plates and a plurality of negative electrode plates alternately upon one another with intervening separators therebetween, such that lateral edges of the positive electrode plates protrude beyond the negative electrode plates on one side, and lateral edges of the negative electrode plates protrude beyond the group of positive electrode plates on the opposite side; and integrally joining the protruded lateral edges of the positive electrode plates together and the protruded lateral edges of the negative electrode plates together, respectively, by means of a thermal spray process.

9. The method of manufacturing an electrode plate unit for a battery according to claim 8, further comprising the step of connecting collector plates to the respective protruded lateral edges of the positive and negative electrode plates.

10. The method of manufacturing an electrode plate unit for a battery according to claim 9, wherein said collector plates have comb-shaped portions, further comprising the step of inserting said comb-shaped portions of the collector plates between the lateral edges of the positive electrode plates and the lateral edges of the negative electrode plates, respectively, whereby said collector plates are integrally joined to the positive and negative electrode plates by thermally sprayed metal.

11. The method of manufacturing an electrode plate unit for a battery according to claim 9, wherein said connecting collector plates to the respective protruded lateral edges of the positive and negative electrode plates comprise disposing perforated member in contact with the respective protruded lateral edges of the positive and negative electrode plates, wherein said thermal spray process is perform over said perforated member.

12. The method of manufacturing an electrode plate unit for a battery according to claim 9, wherein said collector plates are formed with a perforated portion on at least part thereof, and said thermal spray process is performed to said perforated portion of the collector plates.

13. The method of manufacturing an electrode plate unit for a battery according to claim 9, further comprising the step of forming bent portions to the respective lateral edges of the positive and negative electrode plates such as to come close to or abut on the lateral edges of adjacent positive or negative electrode plates, prior to said thermal spray process.

* * * * *

UNITED STATES PATENT AND TRADEMARK OFFICE
CERTIFICATE OF CORRECTION

PATENT NO.     : 6,475,667 B1                                        Page 1 of 1
DATED          : November 5, 2002
INVENTOR(S)    : M. Onishi et al.

It is certified that error appears in the above-identified patent and that said Letters Patent is hereby corrected as shown below:

Column 8,
Line 13, "comprise" should be -- comprises --.
Lines 14 and 17, "member" should be -- members --.
Line 16, "perform" should be -- performed --.

Signed and Sealed this

Twelfth Day of August, 2003

JAMES E. ROGAN
*Director of the United States Patent and Trademark Office*